United States Patent
Todd

(10) Patent No.: US 8,646,528 B2
(45) Date of Patent: Feb. 11, 2014

(54) COMPOSITIONS AND METHODS RELATING TO ESTABLISHING CIRCULATION IN STAND-ALONE-SCREENS WITHOUT USING WASHPIPES

(75) Inventor: Bradley L. Todd, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 308 days.

(21) Appl. No.: 12/970,245

(22) Filed: Dec. 16, 2010

(65) Prior Publication Data
US 2012/0152538 A1    Jun. 21, 2012

(51) Int. Cl.
*E21B 43/08* (2006.01)
*E21B 43/04* (2006.01)

(52) U.S. Cl.
USPC ............ 166/278; 166/227; 166/228; 166/276

(58) Field of Classification Search
None
See application file for complete search history.

(56) References Cited

U.S. PATENT DOCUMENTS

| | | | | |
|---|---|---|---|---|
| 3,273,641 A * | 9/1966 | Bourne et al. | | 166/276 |
| 3,353,599 A * | 11/1967 | Swift | | 166/278 |
| 3,880,233 A * | 4/1975 | Muecke et al. | | 166/205 |
| 4,202,411 A * | 5/1980 | Sharp et al. | | 166/244.1 |
| 4,239,084 A * | 12/1980 | Sharp et al. | | 166/278 |
| 5,240,074 A * | 8/1993 | Peavy et al. | | 166/286 |
| 5,333,688 A | 8/1994 | Jones et al. | | |
| 5,476,143 A * | 12/1995 | Sparlin et al. | | 166/233 |
| 5,492,178 A * | 2/1996 | Nguyen et al. | | 166/276 |
| 5,871,049 A * | 2/1999 | Weaver et al. | | 166/276 |
| 5,934,376 A * | 8/1999 | Nguyen et al. | | 166/278 |
| 6,394,185 B1 * | 5/2002 | Constien | | 166/296 |
| 6,752,206 B2 * | 6/2004 | Watson et al. | | 166/278 |
| 6,755,245 B2 * | 6/2004 | Nguyen et al. | | 166/236 |
| 6,831,044 B2 * | 12/2004 | Constien | | 507/201 |
| 6,837,308 B2 * | 1/2005 | Michel | | 166/51 |
| 7,080,688 B2 * | 7/2006 | Todd et al. | | 166/278 |
| 7,140,438 B2 * | 11/2006 | Frost et al. | | 166/278 |
| 7,178,595 B2 * | 2/2007 | Michel | | 166/278 |
| 7,276,466 B2 * | 10/2007 | Todd et al. | | 507/260 |
| 7,290,610 B2 * | 11/2007 | Corbett et al. | | 166/278 |
| 7,360,593 B2 * | 4/2008 | Constien | | 166/227 |
| 7,497,278 B2 | 3/2009 | Schriener et al. | | |
| 7,527,095 B2 * | 5/2009 | Bloess et al. | | 166/265 |

(Continued)

FOREIGN PATENT DOCUMENTS

WO    WO2012/083114 A2    6/2012

OTHER PUBLICATIONS

Melling et al., "Fiber-Optic Probes for Mid-Infrared Spectrometry," Handbook of Vibrational Spectroscopy, John Wiley & Sons Ltd., Chichester, 2002.

(Continued)

*Primary Examiner* — Angela M DiTrani
*Assistant Examiner* — Anuradha Ahuja
(74) *Attorney, Agent, or Firm* — Holly Soehnge; McDermott Will & Emery LLP

(57) ABSTRACT

Of the methods provided herein, one example of a method that is disclosed includes the steps of placing a stand-alone-screen that does not comprise a concentric washpipe in a well bore, and forming an in situ coated stand-alone-screen in the well bore by placing a screen-plugging filter cake on the interior surface of the stand-alone-screen, the screen-plugging filter cake comprising particulate plugging agents deposited by a packing slurry.

20 Claims, 3 Drawing Sheets

(56) References Cited

U.S. PATENT DOCUMENTS

| | | | |
|---|---|---|---|
| 7,553,800 B2* | 6/2009 | Munoz, Jr. | 507/114 |
| 7,598,208 B2 | 10/2009 | Todd | |
| 7,789,146 B2* | 9/2010 | Panga et al. | 166/278 |
| 8,008,234 B2* | 8/2011 | Panga et al. | 507/203 |
| 8,119,574 B2* | 2/2012 | Panga et al. | 507/200 |
| 8,322,419 B2* | 12/2012 | Parlar et al. | 166/278 |
| 2002/0142919 A1* | 10/2002 | Constien | 507/100 |
| 2002/0166661 A1* | 11/2002 | Nguyen et al. | 166/51 |
| 2004/0014606 A1* | 1/2004 | Parlar et al. | 507/100 |
| 2004/0040706 A1 | 3/2004 | Hossaini et al. | |
| 2004/0231845 A1* | 11/2004 | Cooke, Jr. | 166/279 |
| 2005/0034861 A1* | 2/2005 | Saini et al. | 166/278 |
| 2005/0034868 A1* | 2/2005 | Frost et al. | 166/307 |
| 2005/0051363 A1* | 3/2005 | Munoz et al. | 175/72 |
| 2005/0065037 A1* | 3/2005 | Constien | 507/203 |
| 2005/0082060 A1* | 4/2005 | Ward et al. | 166/278 |
| 2005/0126785 A1* | 6/2005 | Todd | 166/307 |
| 2006/0105917 A1* | 5/2006 | Munoz | 507/103 |
| 2008/0185157 A1 | 8/2008 | Jordan et al. | |
| 2009/0025932 A1* | 1/2009 | Panga et al. | 166/278 |
| 2009/0255686 A1* | 10/2009 | Richard et al. | 166/376 |
| 2010/0212897 A1* | 8/2010 | Nguyen et al. | 166/280.1 |
| 2010/0300688 A1* | 12/2010 | Panga et al. | 166/280.2 |
| 2012/0043082 A1* | 2/2012 | Nguyen et al. | 166/295 |

OTHER PUBLICATIONS

Utzinger et al., "Fiber Optic Probes for Biomedical Optical Spectroscopy," Journal of Biomedical Optics 8(1), 121-147, 2003.
International Search Report and Written Opinion for PCT/US2011/065364 dated Aug. 3, 2012.

* cited by examiner

US 8,646,528 B2

COMPOSITIONS AND METHODS RELATING TO ESTABLISHING CIRCULATION IN STAND-ALONE-SCREENS WITHOUT USING WASHPIPES

BACKGROUND

The present invention relates to methods useful in sand control applications for subterranean operations. More particularly, the present invention relates to methods of creating improved circulation through stand-alone-screens used to combat particulate migration and improved placement of clean-up materials for removing drill-in filter cakes. Additionally, the methods of the present invention may be useful to repair coated screens.

Open-hole completions in soft or poorly consolidated formations require that the drill-in fluid, the sand control screen, and the cleanup system for removal of the drill-in fluid filter cake (a type of borehole filter cake) all perform together in order to provide acceptable solids control and production rates. When selecting the sand control screen for an interval, one must take into consideration the particle size distribution of any formation material that may be present in the production interval as well as the flow capacity necessary for the well to be commercially successful. Long horizontal completions often pose challenges in selecting effective sand control screens due to the wide variation in formation particle size distributions encountered across the interval.

It is well known in the subterranean well drilling and completion art that relatively fine particulate materials may be produced during the production of hydrocarbons from a well that traverses an unconsolidated or loosely consolidated formation. Numerous problems may occur as a result of the production of such particulates. For example, the particulates may lead to abrasive wear of components within the well, such as tubing, pumps and valves. In addition, the particulates may partially or fully clog the well creating the need for an expensive workover. Also, if the particulate matter is produced to the surface, it should be removed from the hydrocarbon fluids using surface processing equipment.

One method for controlling and preventing the production of such particulates is to place a gravel pack neighboring a portion of the well bore containing an unconsolidated or loosely consolidated production interval. Stand-alone-screens often are used as an alternative to gravel packs, based on the conditions present in the well bore and/or on the personal preference of the well operator. Stand-alone-screens are generally considered to be more cost-effective in terms of time and money to install over gravel packs. FIG. 1 illustrates a stand-alone-screen installed in a horizontal well bore.

A stand-alone-screen is a metal filter assembly used to support and retain the formation particulates. Stand-alone-screens may include various types of screens. Wire-wrap screens, the most common design, generally are a drilled or slotted basepipe with wire filters. In early versions, fluids flowed only through openings in the basepipe, so ribs, or rods, were added to form a small annulus for increased flow capacity and to reduce plugging. Other types of screens are pre-packed screens, which are manufactured with high-permeability resin-coated gravel between two layers of wire-wrap filter media. Premium-mesh screen designs use a specialized wire-cloth media around a wire-wrap-screen. These screens usually include a shroud with drilled holes for additional protection during installation or have openings designed to reduce erosion caused by sand grains and fine particles impacting directly on the internal filter media at high velocity. A range of sizes and screen configurations is available to suit the characteristics of the well bore, production fluid, and the formation particulates. Any of these screens may be pre-coated with a suitable coating (e.g., poly lactic acid), if desired.

Stand-alone-screens normally are used in conjunction with a concentric washpipe. The washpipe can alleviate issues, for example, when the screen has encountered an obstruction on run in. FIG. 2 illustrates a typical installation wherein a stand-alone-screen has a concentric washpipe within a subterranean formation. The washpipe may be useful to remove obstructions in the well bore and/or act as a conduit for fluid returns and carry a shifting mechanism to open or close a return port. FIG. 3 illustrates an instance where an obstruction of a bed of drill solids is present. The washpipe may be useful to provide a fluid that is able to entrain the obstruction, thus removing it from the fluid flow path. Oftentimes, the risk of obstructions in the formation is sufficient enough reason for operators to choose to use a washpipe with a stand-alone-screen, despite the many problems that are associate with such washpipes.

In many instances, the use of washpipe, especially in long horizontal wells, means the loss of valuable rig time due to make-up and break-up of the washpipe, or recovery if the washpipe is stuck. Economic considerations, along with completion efficiencies, are especially important on deepwater completions, especially in the unfortunate case of fishing if the washpipe becomes stuck. If one could avoid using washpipe, this could reduce rig time, generating significant cost savings, and also eliminating the risk of getting stuck.

Pre-coated screens that are pre-coated with various coatings have been used. These coatings are generally polyesters that eventually degrade to allow free flow through the screen and may generate an acid upon degradation. The coatings can be designed to provide certain functionalities, which may include protection of the screen during placement, and generating materials from the degradation of the coating to help with borehole cleanup. Other functionalities may also be desirable. These pre-coated screens present several potential disadvantages. For instance, the coating may be damaged when the screen is being placed downhole, which could be particularly problematic because the screen would not have a washpipe functionality. Secondly, to have enough coatings to address every potential condition that may be encountered in a subterranean operation would require the warehousing of many different kinds of screens and coating materials, which is undesirable and costly.

SUMMARY OF THE INVENTION

The present invention relates to methods useful in sand control applications for subterranean operations. More particularly, the present invention relates to methods of creating improved circulation through stand-alone-screens used to combat particulate migration and improved placement of clean-up materials for removing drill-in filter cakes. Additionally, the methods of the present invention may be useful to repair coated screens.

In one embodiment, the present invention provides a method comprising: placing a stand-alone-screen that does not comprise a concentric washpipe in a well bore penetrating a subterranean formation; forming an in situ coated stand-alone-screen by placing a screen-plugging filter cake on the interior surface of the stand-alone-screen, the screen-plugging filter cake comprising particulate plugging agents deposited by a packing slurry; and circulating a fluid through the longitudinal axis of the in situ coated screen.

In one embodiment, the present invention provides a method comprising: placing a stand-alone-screen that does not comprise a concentric washpipe in a well bore, and forming an in situ coated stand-alone-screen in the well bore by placing a screen-plugging filter cake on the interior surface of the stand-alone-screen, the screen-plugging filter cake comprising particulate plugging agents deposited by a packing slurry.

In one embodiment, the present invention provides a method comprising: placing a stand-alone-screen in a well bore that does not comprise a concentric washpipe, forming a screen-plugging filter cake on the interior surface of the stand-alone-screen, the filter cake comprising particulate plugging agents deposited by a packing slurry; and allowing the particulate plugging agents to degrade to provide degradation products that interact with the borehole filter cake so as to degrade at least a portion of the borehole filter cake.

In one embodiment, the present invention provides a method of repairing a pre-coated stand-alone screen comprising: placing the pre-coated stand-alone screen in a borehole, the pre-coated stand-alone screen comprising a coating having a damaged portion; and forming a screen-plugging filter cake on the interior surface of the stand-alone-screen, the filter cake comprising particulate plugging agents deposited by a packing slurry.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments.

DETAILED DESCRIPTION

The present invention relates to methods useful in sand control applications for subterranean operations. More particularly, the present invention relates to methods of creating improved circulation through stand-alone-screens used to combat particulate migration and improved placement of clean-up materials for removing drill-in filter cakes. Additionally, the methods of the present invention may be useful to repair coated screens.

The methods of the present invention may be applicable to horizontal, vertical, deviated, diagonal, S-shaped, or other nonlinear well bores in any type of subterranean formation. The methods may be applicable to injection wells as well as production wells, including hydrocarbon wells. Moreover, the methods of the present invention may be especially useful in horizontal open-hole wells.

Of the many advantages of the present invention, only a few of which are discussed or alluded to herein, the present invention provides for an in situ creation of a coated stand-alone-screen. Two advantages may be readily apparent. First, the coating can be tailored to the particular conditions present in the well bore, for example, bottom hole temperature, differential pressure, etc. This overcomes many disadvantages associated with warehousing and manufacturing pre-coated stand-alone-screens that may not be suitable for use in a particular application due to unanticipated or peculiar conditions present in a given job. Secondly, the use of a washpipe and its associated disadvantages can be avoided. Further, because the methods of the present invention allow the operators at the drill-site to run the screen without the washpipe, running of the screen assembly can be simplified. Additionally, through the methods of the present invention, the desirable functionality of the washpipe can be retained.

In some embodiments, the methods of the present invention also present an additional means of placing borehole filter cake clean up agents, e.g., in solution form, during a spurt loss of the filtrate from the packing slurry through the screen to a neighboring annulus between the screen and the formation face of an open hole interval.

Additionally, the methods of the present invention provide for the repair of pre-coated screens through the formation of a screen-plugging filter cake on the interior surface of the stand-alone-screen to counteract the damage.

The tell "filter cake" as referred to herein refers to the residue deposited on a permeable medium when a slurry, such as a packing slurry, a drilling fluid, or a drill-in fluid, is forced against the medium under a pressure. Filtrate is the liquid that passes through the medium, leaving the cake on the medium.

Figure 1:
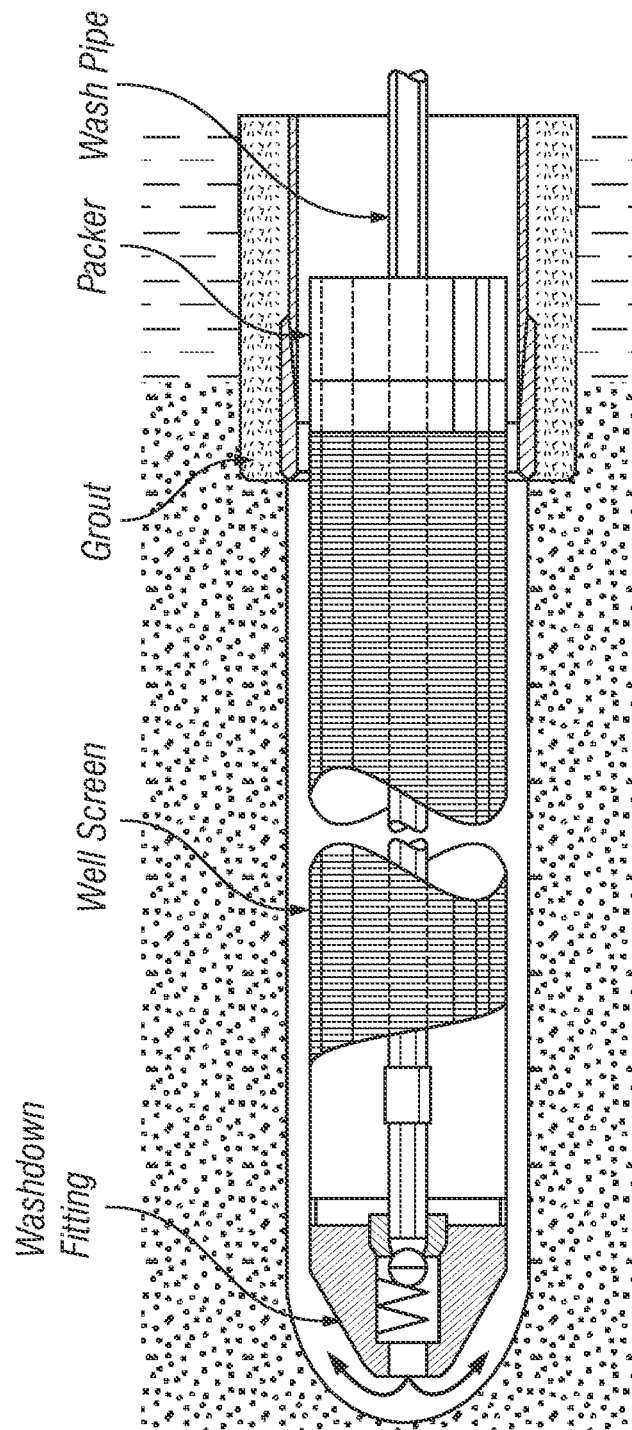
FIG. 1 illustrates a horizontal well configuration wherein a stand-alone-screen is placed in a well bore and a concentric washpipe is placed within the stand-alone-screen.
Figure 2:
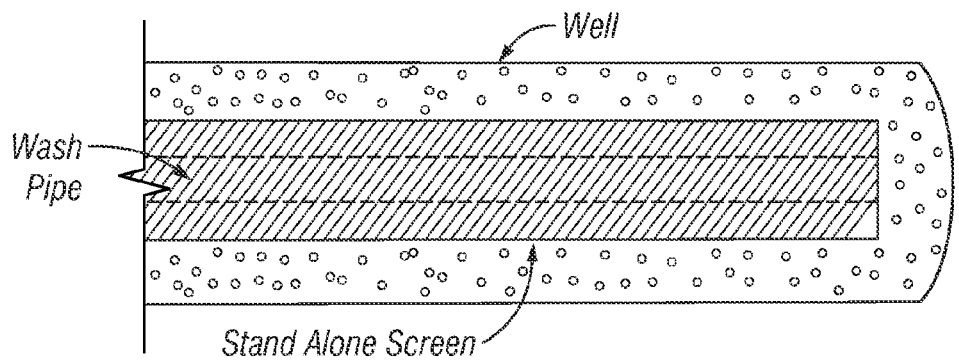
FIG. 2 illustrates a horizontal well configuration wherein a stand-alone-screen is placed in a well bore and a concentric washpipe is placed within the stand-alone-screen.
Figure 3:
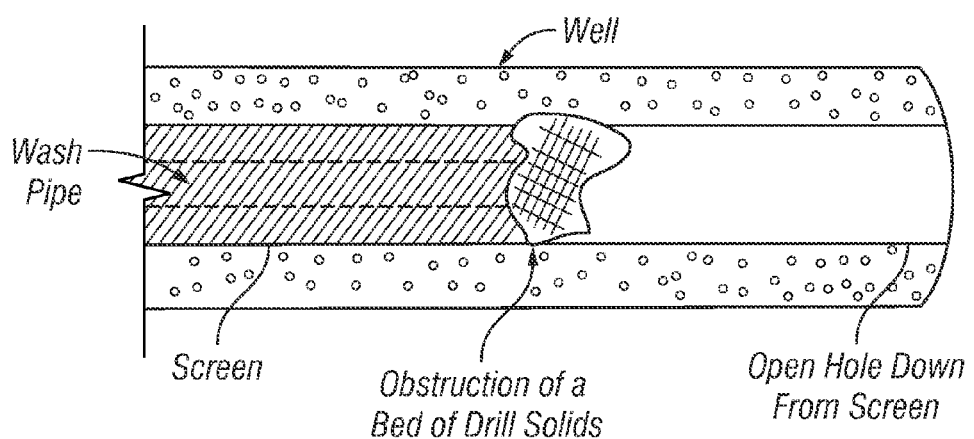
FIG. 3 illustrates an obstruction in a well bore.
Figure 4:
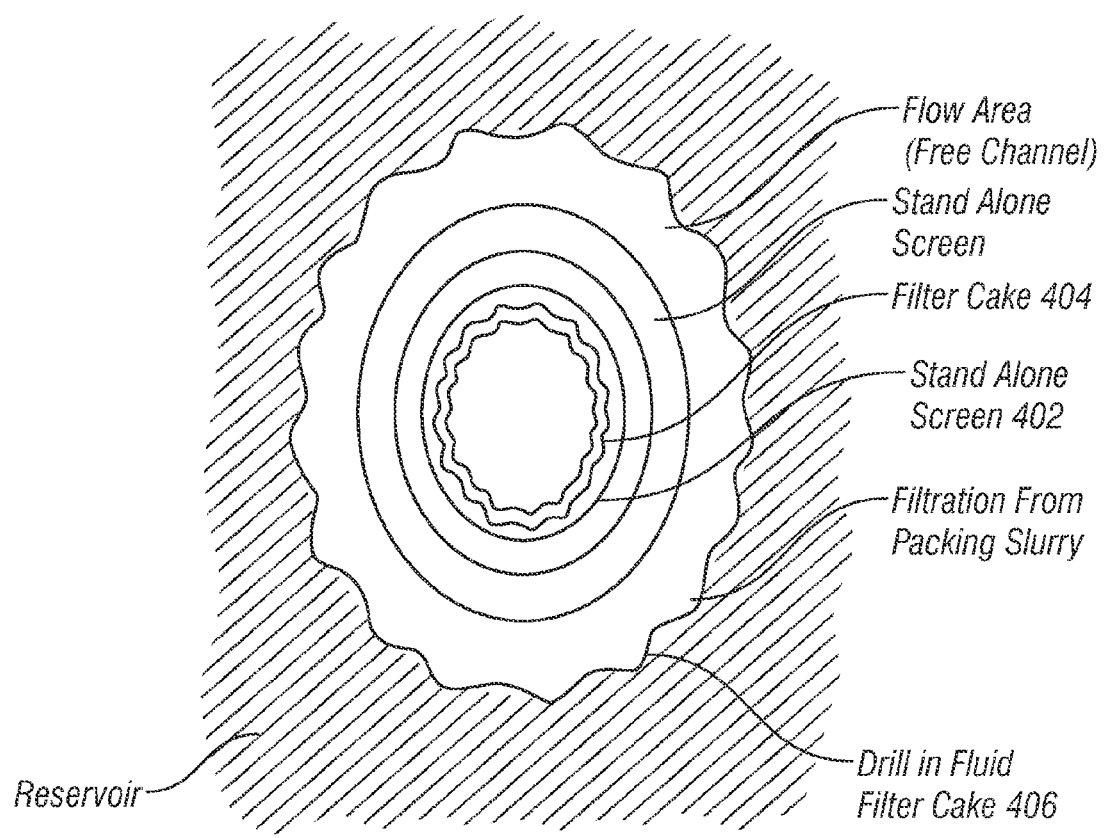
FIG. 4 illustrates an embodiment of the invention illustrating the absence of a washpipe in the configuration.

FIG. 4 illustrates an embodiment of the present invention. In FIG. 4, a stand-alone-screen is shown at 402. A filter cake is shown on the interior surface of the screen at 404. This screen-plugging filter cake is believed to coat the inside of the screen to prevent fluid loss through the sides of the screen and to facilitate fluid flow through the longitudinal axis of the screen. In some embodiments, the screen-plugging filter cake is degradable, and comprises degradable particulate plugging agents deposited by a packing slurry to form an in situ coated stand-alone-screen. A borehole filter cake (e.g., formed by a drill-in fluid or a drilling fluid) is shown at 406. In preferred embodiments, the degradation products of the screen-plugging filter cake are useful to degrade the borehole filter cake.

Optionally, or additionally, borehole filter cake clean up agents may be dissolved within the filtrate of the packing slurry. Spurt loss (or loss of the filtrate from the packing slurry through the screen openings as the screen-plugging filter cake develops within the stand-alone-screen) is thought to lead to solubilized borehole filter cake clean up agents contacting the borehole filter cake on a neighboring formation face so as to degrade it. The desired concentration of the borehole filter cake clean up agents in the filtrate can vary based on the concentration needed to degrade the borehole filter cake, and can be determined by one skilled in the art based on the circumstances present in the particular job.

The surrounding subterranean formation is shown at 408. Notably a concentric washpipe is not present in the configuration. An annulus of the well bore is shown at the flow area. The formation of a screen-plugging filter cake on the interior surfaces of the stand-alone-screen allows the operators at the drill-site to run the screen without the washpipe, which simplifies the running of the screen assembly at the job. Once the screen is plugged by the screen-plugging filter cake, the circulation path is then through the longitudinal axis of the screen rather than through the screen openings. In some embodiments, the circulation path continues out through the casing shoe and around the outside of the screen to the annulus.

In some embodiments, the present invention provides methods that include a method comprising: placing a stand-alone-screen that does not comprise a concentric washpipe in a well bore, and forming an in situ coated stand-alone-screen in the well bore by forming a screen-plugging filter cake on the interior surface of the stand-alone-screen, the filter cake comprising particulate plugging agents deposited by a packing slurry. In such embodiments, the screen-plugging filter cake may function as a washpipe to provide washing action for removing any downstream obstructions. The screen-plugging filter cake may facilitate fluid flow through the longitudinal axis of the screen, for example, to a casing shoe.

In some embodiments, the screen-plugging filter cake may form on the inside of the stand-alone-screen as the fluid is passing through the screen upon initial pumping after a spurt loss of the packing slurry filtrate to the neighboring annulus between the screen and the formation face. Any solubilized borehole filter cake clean up agents present in the filtrate may be able to interact with the borehole filter cake in such a way as to degrade the filter cake at a desired time.

In some embodiments, optionally, the filter cake may form on the exterior surface of the stand-alone-screen. This may be due to spurt loss or circulation of the fluid through the workstring/borehole annulus or stand-alone screen borehole annulus. In such embodiments, the exterior screen filter cake may comprise components that may be used to degrade a neighboring borehole filter cake.

In some embodiments, the present invention provides methods that include a method comprising: placing a stand-alone-screen that does not comprise a concentric washpipe in a well bore; forming a screen-plugging filter cake on the interior surface of the stand-alone-screen, the filter cake comprising degradable particulate plugging agents deposited by a packing slurry; and allowing the degradable particulate plugging agents to degrade to provide degradation products that interact with the borehole filter cake so as to degrade at least a portion of the borehole filter cake.

Optionally, in some embodiments, for example, if the screen encountered a hold-up (e.g., an obstruction) during run-in, a fluid (e.g., without any particulate plugging agents) may be pumped through the longitudinal axis of the screen assembly. This may allow washing of fill similar to the function of a washpipe.

The methods of the present invention may be used in conjunction with any suitable stand-alone-screen. Examples include, but are not limited to, wire wrapped screens, mesh wire screens, sintered metal screens, and pre-packed gravel screens. Many of these are commercially available. A suitable screen is commercially available as "PETROGUARD®" Advanced Mesh Screen from Halliburton Energy Services, Inc., in Houston, Tex. (www.halliburton.com).

The packing slurries of the present invention may comprise a base fluid and particulate plugging agents. The packing slurry may be customized for a particular application.

The base fluid may be any fluid known in the art for use in the placement of particulate plugging agents; the base fluid may be either a water-based or an oil-based fluid. In some embodiments, the base fluid may be viscosified with a suitable viscosifying agent. The advisability of including a viscosifying agent may be dictated by the density of the particulate plugging agents as well as other operational considerations. Any filtrate that passes through the screen will comprise elements of the base fluid.

In some embodiments, these particulate plugging agents may be degradable particulate plugging agents. The particulate plugging agents may be present in the packing slurries of the present invention in an amount sufficient to provide a desired amount of fluid loss control within the stand-alone-screen. In certain embodiments, the particulate plugging agent may be present in an amount in the packing slurry in a range of from about 0.01% to about 20% by weight. In certain embodiments, the particulate plugging agent may be present in an amount in the range of from about 0.1% to about 5% by weight.

In certain embodiments, the particulate plugging agents may have a particle size distribution in the range of from about 0.1 micron to about 1.0 millimeter; the chosen size may depend on the size of any openings in the screen, for example, the screen mesh or gap. Certain embodiments of the treatment fluids of the present invention may comprise particulate plugging agents having a broader particle size distribution or a narrower particle size distribution.

The particulate plugging agent material can comprise, for example: enzymes such as hemicellulase; oxidizers such as sodium or ammonium persulfate; organic acids, such as citric acid; chelating agents, such as EDTA; esters; orthoesters; and, mixtures of two or more materials and the like.

Similarly, the borehole filter cake clean up agents that are solubilized within the filtrate may comprise enzymes such as hemicellulase or esterase enzymes; oxidizers such as sodium or ammonium persulfate; organic acids, such as citric acid; chelating agents; and, mixtures of two or more materials and the like. Chelating agents that may be used include EDTA, and HEDTA. Other suitable chelating agents may include members of a class of diamine or monoamine monoamide-N, N'-dipolyacids, N, N'-bis(2-hydroxybenzyl)ethylenediamine-N, N'-diacetic acids, precursors thereof, salts thereof, and combinations thereof Also, other suitable chelating agents may include dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenylacetic) acid ("EDDHA"), glucoheptonic acid, gluconic acid, and the like, and nitrilotriacetic acid ("NTA").

In certain instances, to achieve certain beneficial effects of the present invention, the particulate plugging agents should have a specific gravity that will enable them to remain in a desired location within the well bore. For instance, the specific gravity of the particulate plugging agents should be high enough that they do not return to the surface during the operation and they do not slump when downhole.

Suitable types of non-self-degradable particulates include solids that may be added to the packing slurry to bridge across openings in the stand-alone-screen, thereby building a screen-plugging filter cake on the interior surfaces of the screen. Examples include, but are not limited to, calcium carbonate (acid-soluble), suspended salt (water-soluble), oil-soluble resins, mica, nutshells, wax beads, and fibers. In some embodiments, the non-self-degradable particulate bridging agents may be dissolved with an appropriate agent (e.g., an acid).

In some embodiments, the particulate plugging agents are degradable at well bore conditions. In such embodiments, the particulate plugging agents may comprise a degradable material that is capable of undergoing an irreversible degradation downhole. The term "irreversible," as used herein, means that the particulate plugging agent, once degraded, should not recrystallize or reconsolidate while downhole, e.g., the particulate plugging agent should degrade in situ (in the well bore), but should not recrystallize or reconsolidate in situ (in the well bore). The terms "degradation" and "degradable" refer to both the two relatively extreme cases of hydrolytic degradation that the particulate plugging agent may undergo (e.g., bulk erosion and surface erosion), and any stage of degradation in between these two. This degradation can be a result of, inter alia, a chemical or thermal reaction, or a reaction induced by radiation.

In certain embodiments wherein the particulate plugging agents are degradable, the particulate plugging agents may degrade slowly over time, as opposed to instantaneously. Slow degradation of the particulate plugging agent may, inter alia, help to maintain the stability of the screen-plugging filter cake. The time required for degradation of the particulate plugging agents may depend on factors including, but not limited to, the temperature to which the particulate plugging agents are exposed, as well as the type of particulate plugging agent used. In certain embodiments, the particulate plugging agent may not degrade until a time in the range of from at least about 12 to about 96 hours after their placement in the subterranean formation. In certain embodiments, the particulate plugging agent may not degrade until a time in the range of from at least about 12 to about 24 hours after its placement in the subterranean formation. The temperatures range at which it is usually advantageous for these to degrade is from about 120° F. to about 225° F.

In the degradable embodiments, the particulate plugging agents may comprise a variety of degradable materials. Non-limiting examples of suitable degradable materials that may be used in conjunction with the present invention include, but are not limited to, degradable polymers, dehydrated organic or inorganic compounds, and/or mixtures thereof In choosing the appropriate degradable material, one should consider the degradation products that will result and their interaction with the borehole filter cake as well as the screen-plugging filter cake. Also, these degradation products should not adversely affect other operations or components. For example, a boric acid derivative may not be included as a degradable material in the treatment fluids of the present invention that utilize xanthan as the viscosifier, because boric acid and xanthan are generally incompatible. One of ordinary skill in the art, with the benefit of this disclosure, will be able to recognize when potential components of the treatment fluids of the present invention would be incompatible or would produce degradation products that would adversely affect other operations or components.

Suitable examples of degradable polymers that may be used in accordance with the present invention include, but are not limited to, homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process.

Specific examples of suitable polymers include, but are not limited to, polysaccharides such as dextran or cellulose; chitin; chitosan; proteins; aliphatic polyesters; poly(lactides); poly(glycolides); poly(lactones); poly(ϵ-caprolactones); poly(hydroxybutyrates); poly(anhydrides); aliphatic polycarbonates; poly(orthoesters); poly(amino acids); poly(ethyleneoxide); and polyphosphazenes. Of these suitable polymers, aliphatic polyesters and poly(anhydrides) may be preferred for some applications.

The choice of degradable material for use in the particulate plugging agents of the present invention may depend, at least in part, on the conditions of the well, e.g., well bore temperature. For instance, lactides have been found to be suitable for lower temperature wells, including those within the range of about 60° F. to about 150° F., and polylactides have been found to be suitable for well bore temperatures above this range. Dehydrated organic or inorganic compounds also may be suitable for higher temperature wells.

In some instances, the degradable material incorporated in the particulate plugging agent is an acid precursor that may generate an acid that can be usefully employed to interact with the borehole filter cake.

In some embodiments, the particulate plugging agents may comprise a delayed-release oxidizer component that will release an acid-consuming component, and/or a delayed-release acid component that will release an acid derivative. When interacting with a filter cake, the acid-consuming component interacts with acids in such a way that the acids do not interact with the acid-soluble portion of the filter cake for a period of time. In effect, this delays degradation of the acid-soluble portion of the filter cake by the acid. Thus, the integrity of the filter cake may not be jeopardized for a given desired delay period. It is important to note that a very small percentage of the acid-soluble portion of the filter cake (e.g., less than about 2%) need be degraded to compromise the integrity of the filter cake. The reaction between the acid-consuming component and the acid derivative also generates a peroxide that ultimately can degrade the polymeric portion of the filter cake. For instance, if calcium peroxide is used, when the calcium peroxide interacts with acetic acid, calcium acetate and hydrogen peroxide are produced. The hydrogen peroxide then is able to interact with the polymeric portion of the filter cake to ultimately degrade at least a portion of the polymeric portion of the filter cake.

In certain preferred embodiments, the delayed-release oxidizer components comprise acid-consuming components such as peroxides. Suitable examples include $ZnO_2$, $CaO_2$, and $MgO_2$. Generally, the delayed-release oxidizer component will be present in an amount sufficient to delay interaction between the acid derivative of the delayed-release acid component and the acid-soluble portion of the filter cake, and in an amount sufficient to produce a sufficient amount of peroxide (e.g., hydrogen peroxide) when reacting with the acid derivative to ultimately degrade at least a portion of the polymeric portion of the filter cake. In certain embodiments, the delayed-release oxidizer component will comprise at least about 0.1% to about 4%, and preferably in some embodiments about 0.2% to about 1%, of the packing slurries of the present invention. If a long delay of the interaction between the acid derivative and the acid-soluble portion of the filter cake is desired, more of the acid-consuming component may be included. However, the particular acid-derivative component of the delayed-release acid composition, the particular components of the filter cake, and any other components present (e.g., other acids) will dictate the appropriate amount to include. Also, the desired delay period for degrading the filter cake should be considered in deciding what the appropriate relative concentrations of the delayed-release acid component and the delayed-release oxidizer component are in a packing slurry of the present invention. One of ordinary skill in the art, with the benefit of this disclosure, will recognize the appropriate amount of each component to include for a desired application.

In certain embodiments, the delayed-release oxidizer components may also comprise inherent by-products of the manufacture of such acid-consuming components. Such by-products may include derivatives such as oxides and hydroxides of the ion, e.g., calcium oxide, zinc oxide, magnesium oxide, zinc hydroxide, calcium hydroxide, and magnesium hydroxide. For instance, some commercial samples of calcium peroxide are only about 70% pure; the remaining 30% may comprise calcium oxide and calcium hydroxide. These by-products also may interact with the acid derivative to delay interaction of the acid derivative with the acid-soluble portion of the filter cake. Similarly, zinc peroxide and magnesium peroxide are commercially available with similar purity levels. Because of the effect that the by-products may have on the overall filter cake degradation, the relative purity of the acid-consuming component and its associated by-products should be considered.

Suitable delayed-release acid components of the packing slurries of the present invention comprise an acid derivative. Examples of suitable acid derivatives include esters; poly (orthoesters); aliphatic polyesters; lactides, poly(lactides); glycolides; poly(glycolides); lactones; poly(ε-caprolactones); poly(hydroxybutyrates); anhydrides; poly(anhydrides); and poly(amino acids). The delayed-release acid component also may comprise an esterase enzyme, if desired. Blends of certain acid-releasing degradable materials also may be suitable. One example of a suitable blend of materials includes a blend of a poly(lactic acid) and an orthoester. It is within the ability of one skilled in the art, with the benefit of this disclosure, to select a suitable acid-releasing degradable material. When used in the present invention, a preferable result is achieved if the acid-releasing degradable material degrades slowly over time as opposed to instantaneously.

The delayed-release acid component should be included in packing slurries of the present invention in an amount sufficient to react with the acid-consuming component of the delayed-release oxidizer component and then interact with the acid-soluble component of the borehole filter cake so as to degrade at least a portion of it. In some embodiments, this will be from about 1% to about 40% of the composition and in certain preferred embodiments, from about 5% to about 20% of the composition.

Examples of particulate plugging agents for filter cake removal are disclosed in U.S. Pat. No. 7,598,208, the entirety of which is incorporated by reference herein.

In some embodiments, the particulate plugging agents may comprise an orthoester composition. These orthoester compositions generate acids that are capable of degrading the acid-soluble portion of a filter cake. Examples of orthoesters suitable to include in the present invention have a structure defined by the formula: RC(OR')(OR'')(OR'''), wherein R', R'', and R''' are not hydrogen, and R', R'', and R''' may or may not be the same group. R', R'', or R''' may comprise a heteroatom that may affect the solubility of the chosen orthoester in a given application. Suitable heteroatoms could include nitrogen or oxygen. Examples of suitable orthoesters and poly (orthoesters) include, but are not limited to, orthoacetates, such as trimethyl orthoacetate, triethyl orthoacetate, tripropyl orthoacetate, triisopropyl orthoacetate, and poly(orthoacetates); orthoformates, such as trimethyl orthoformate, triethyl orthoformate, tripropyl orthoformate, triisopropyl orthoformate, and poly(orthoformates); and orthopropionates, such as trimethyl orthopropionate, triethyl orthopropionate, tripropyl orthopropionate, triisopropyl orthopropionate, and poly(orthopropionates). Suitable orthoesters also may be orthoesters of polyfunctional alcohols, such as glycerin and/or ethylene glycol. Those skilled in the art with the benefit of this disclosure will recognize suitable orthoesters that may be used in a desired application. In choosing an orthoester, one should be mindful that some orthoesters have low flash points. Therefore, the choice of which particular orthoester to use should be guided by such considerations as environmental factors.

Examples of particulate plugging agents for filter cake removal are disclosed in U.S. Pat. No. 7,497,278, the entirety of which is incorporated by reference herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an" as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
    placing a stand-alone-screen that does not comprise a concentric washpipe in a well bore penetrating a subterranean formation, the stand-alone-screen having a longitudinal axis;
    forming a screen-plugging filter cake on an interior surface of the stand-alone-screen, whereby an in situ coated stand-alone-screen is formed, the screen-plugging filter cake comprising a residue deposited on the stand-alone-screen by a packing slurry when the packing slurry is forced against the stand-alone-screen under pressure, wherein the packing slurry includes particulate plugging agents that form at least a portion of the residue deposited on the stand-alone-screen;
    preventing fluid loss through sides of the stand-alone-screen with the screen-plugging filter cake; and
    circulating a fluid through the longitudinal axis of the stand-alone-screen.

2. The method of claim 1 wherein forming the screen-plugging filter cake involves a spurt loss of filtrate from the packing slurry to a neighboring annulus between the stand-alone-screen and a face of the subterranean formation.

3. The method of claim 2 wherein the spurt loss comprises a solubilized borehole filter cake clean up agent selected from the group consisting of: an ester, an orthoester, a chelating agent, an enzyme, an oxidizer, an azo compound, an esterase enzyme, and any combination thereof.

4. The method of claim 1 wherein the well bore is a horizontal open-hole well bore.

5. The method of claim 1 wherein the packing slurry comprises an oil-based fluid.

6. The method of claim 1 wherein the particulate plugging agents are present in the packing slurry in an amount in a range of from about 0.01% to about 20% by weight.

7. The method of claim 1 wherein the particulate plugging agents comprise an element selected from the group consisting of: calcium carbonate, a wax bead, mica, a nut shell, a suspended salt, an oil-soluble resin, a fiber, an ester, an orthoester, a chelating agent, an enzyme, an oxidizer, an azo compound, and any combination thereof.

8. The method of claim 1 wherein the particulate plugging agents comprise an element selected from the group consisting of: a degradable polymer, a dehydrated organic compound, a dehydrated inorganic compound, and any combination thereof.

9. The method of claim 1 wherein the particulate plugging agents comprise a delayed-release oxidizer component that will release an acid-consuming component, and/or a delayed-release acid component that will release an acid derivative.

10. The method of claim 1 wherein the particulate plugging agents comprise an element selected from the group consisting of: a poly(orthoester); an aliphatic polyester; a lactide, a poly(lactide); a glycolide; a poly(glycolide); a lactone; a poly(lactone); a poly(ε-caprolactone); a poly(hydroxybutyrate); an anhydride; a poly(anhydride); and a poly(amino acid), and any combination thereof.

11. The method of claim 1 wherein the particulate plugging agents comprise an element selected from the group consisting of: an orthoacetate, trimethyl orthoacetate, triethyl orthoacetate, tripropyl orthoacetate, triisopropyl orthoacetate, a poly(orthoacetate), an orthoformate, trimethyl orthoformate, triethyl orthoformate, tripropyl orthoformate, triisopropyl orthoformate, a poly(orthoformate), orthopropionate, trimethyl orthopropionate, triethyl orthopropionate, tripropyl orthopropionate, triisopropyl orthopropionate, poly(orthopropionates), and any combination thereof.

12. A method comprising:
    placing a stand-alone-screen that does not comprise a concentric washpipe in a well bore; and
    forming a screen-plugging filter cake on an interior surface of the stand-alone-screen while in the well bore, whereby an in situ coated stand-alone-screen is formed and fluid loss is thereby prevented through sides of the stand-alone-screen, the screen-plugging filter cake comprising a residue deposited on the stand-alone-screen by a packing slurry when the packing slurry is forced against the stand-alone-screen under pressure, wherein the packing slurry includes particulate plugging agents that form at least a portion of the residue deposited on the stand-alone-screen.

13. The method of claim 12 wherein the particulate plugging agents comprise an element selected from the group consisting of: calcium carbonate, a wax bead, mica, a nut shell, a suspended salt, an oil-soluble resin, a fiber, an ester, an orthoester, a chelating agent, an enzyme, an oxidizer, an azo compound, and any combination thereof.

14. The method of claim 12 wherein the particulate plugging agents comprise an element selected from the group consisting of: a degradable polymer, a dehydrated organic compound, a dehydrated inorganic compound, and any combination thereof.

15. The method of claim 12 wherein the particulate plugging agents comprise an element selected from the group consisting of: an orthoester;
    a poly(orthoester); an aliphatic polyester; a lactide, a poly(lactide); a glycolide; a poly(glycolide); a lactone; a poly(lactone); a poly(ε-caprolactone); a poly(hydroxybutyrate); an anhydride; a poly(anhydride); and a poly(amino acid), an esterase enzyme, and any combination thereof.

16. The method of claim 12 wherein the particulate plugging agents comprise an element selected from the group consisting of: an orthoacetate, trimethyl orthoacetate, triethyl orthoacetate, tripropyl orthoacetate, triisopropyl orthoacetate, a poly(orthoacetate), an orthoformate, trimethyl orthoformate, triethyl orthoformate, tripropyl orthoformate, triisopropyl orthoformate, a poly(orthoformate), orthopropionate, trimethyl orthopropionate, triethyl orthopropionate, tripropyl orthopropionate, triisopropyl orthopropionate, poly(orthopropionates), and any combination thereof.

17. A method comprising:
    placing a stand-alone-screen in a well bore that does not comprise a concentric washpipe, the well bore having a borehole filter cake formed on at least a portion thereof;
    forming a screen-plugging filter cake on an interior surface of the stand-alone-screen, the filter cake comprising a residue deposited on the stand-alone-screen by a packing slurry when the packing slurry is forced against the stand-alone-screen under pressure, wherein the packing slurry includes particulate plugging agents that form at least a portion of the residue deposited on the stand-alone-screen;
    preventing fluid loss through sides of the stand-alone-screen with the screen-plugging filter cake; and
    allowing the particulate plugging agents to degrade to provide degradation products that interact with the borehole filter cake so as to degrade at least a portion of the borehole filter cake.

18. The method of claim 17 further comprising removing an obstruction located within the well bore with a fluid circulated through the stand-alone-screen.

19. The method of claim 17 wherein the particulate plugging agents comprise an element selected from the group consisting of: calcium carbonate, a wax bead, mica, a nut shell, a suspended salt, an oil-soluble resin, a fiber, an ester, an orthoester, a chelating agent, an enzyme, an oxidizer, an azo compound, and any combination thereof.

20. The method of claim 17 wherein the particulate plugging agents comprise an element selected from the group consisting of: a degradable polymer, a dehydrated organic compound, a dehydrated inorganic compound, and any combination thereof.

* * * * *